Figure 1:
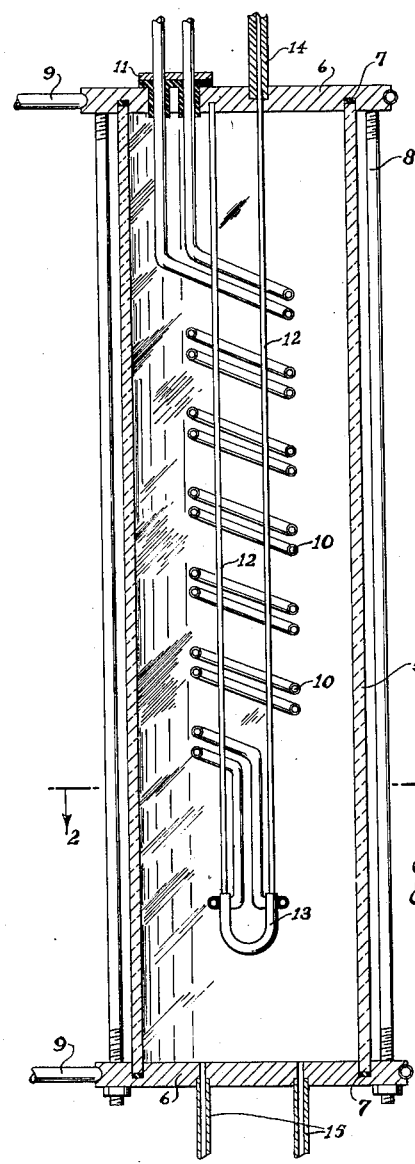

INVENTORS,
L. D. Percival King, Charles P. Baker,
& Raemer E. Schreiber
BY

Patented Jan. 2, 1951

2,536,610

UNITED STATES PATENT OFFICE 2,536,610

HYDROGEN PURIFICATION SYSTEM

L. D. Percival King, Santa Fe, N. Mex., Charles P. Baker, Ithaca, N. Y., and Raemer E. Schreiber, McMinnville, Oreg., assignors to the United States of America as represented by the United States Atomic Energy Commission Application May 22, 1945, Serial No. 595,199

1 Claim. (Cl. 183—2)

This invention relates to a procedure for purifying hydrogen gas and particularly to apparatus for removing pure hydrogen from a gaseous mixture of hydrogen and other substances.

Hydrogen is readily obtained by any of numerous procedures in varying degrees of purity. Some of these methods yield pure hydrogen but at a prohibitive cost for large scale manufacture. In general, the inexpensive methods of production yield relatively impure hydrogen not suitable for general laboratory utility. Thus hydrogen has been produced by passing steam over hot carbon or iron; by electrolysis of aqueous solutions; by the decomposition of hydrogen-containing compounds; by the fractionation of mixtures containing hydrogen, and by the action of acids on metals. In most of these cases, however, the hydrogen is often sufficiently impure to prevent its use in precise laboratory work, such as in the production of proton beams in a cyclotron, and as an ionization chamber gas. Although these methods have been found effective for producing hydrogen of limited purity in substantial quantities, no satisfactory method for producing directly relatively large amounts of pure hydrogen has been developed. Consequently, it has been necessary to evolve methods for purification of the impure hydrogen to make it satisfactory for technical purposes. However, none of these methods are adapted to continuous large scale operations, because they involve time-consuming and intricate steps, some of which are hazardous.

For example, hydrogen can be reacted with metals to form a highly reactive hydride thereof while gaseous impurities do not attack the material. The hydride can then be removed from the impure gases and be treated so as to decompose with the formation of pure hydrogen, i. e., pure hydrogen can be obtained by heat dissociation of the hydride. Another procedure having partial success involves the diffusion of hydrogen through palladium or platinum. An example of this process is found in United States Patent No. 1,174,631 to Walter O. Snelling. In this prior art process of hydrogen diffusion through platinum, the hydrogen under pressure is brought in contact with a thin layer of platinum supported by a base of porous earthenware or alundum and held at a temperature of about 800° C., usually by indirect heating. By maintaining a lower pressure on the other side of the platinum, hydrogen is diffused through the platinum and released in a purified form at the low pressure side.

In these prior art procedures the purification of hydrogen is quite expensive and complicated, usually requiring periodic lengthy shut-downs in order to decontaminate the apparatus by removal of impurities. Furthermore, indirect heating of the platinum results in non-uniform and often unpredictable temperatures therein. Not only does this lower the actual volume of gas which can be purified because of the unequal diffusion but also buckling of the metal film results because of the uneven heating with consequent lowered production or total failure of the apparatus. In addition in the prior art procedures the highly reactive hydrogen which has been ionized by the treatment is often recontaminated.

It is therefore an object of this invention to provide means for the purification of hydrogen without expensive and complicated apparatus.

It is a further object to provide for the purification of hydrogen in a continuous manner employing means stable under long use.

It is still another object to provide means for the purification of hydrogen by diffusion through an unsupported metal layer, e. g., tube, or plate, which metal forms a hydride, said means being structurally strong and durable and simple in operation.

A further object is to provide means for efficiently purifying hydrogen (specifically deuterium) in high yield without loss of the desired agent.

Still another object of the invention is to provide a means of uniform heating of the purifying element.

Another object is to provide a means to prevent buckling of the purifying element.

Other objects will become apparent from the description hereinafter developed including the drawings forming part of this specification:

In general, the objects of this invention are obtained by providing a thin self-supporting layer of a metal which forms a hydride on coming in contact with hydrogen and through which hydrogen will diffuse, maintaining this thin film at a uniform high temperature while holding it under tension, and bringing impure hydrogen under pressure into contact with one face of said layer of metal and maintaining, at the opposite face of said metal layer, a lower pressure.

A novel apparatus for accomplishing the objects of this invention involves the combination of a self-supporting layer, for example, a plate or tube, of a metal through which hydrogen isotopes will reactively diffuse, means for uniformly and directly heating said metal layer to a high temperature of the order of 500° C. to 1000° C., means for holding the layer of metal under tension, means for supplying impure hydrogen gas to one face of the layer and means for removing purified hydrogen from the other face at a lower pressure. It is preferred to operate the latter face at sub-atmospheric pressure in order to have the metal hydride dissociate at a substantial rate and to have the impure hydrogen at a pressure in excess of atmospheric, e. g. about two to ten pounds per square inch.

In the operation of this process and apparatus, it is preferred that a constant pressure of gas be maintained in order to insure a steady rapid flow. A differential in pressure of about three pounds per square inch across the self-supporting metal layer is quite satisfactory although any difference in pressure up to about ten pounds per square inch is possible. Furthermore the metal such as palladium should be of uniform composition and preferably should be held at a uniform temperature in order to avoid buckling or local over-tension. A feature of this invention is the provision of such a uniform heating means, e. g. by resistance or induction heating.

The tension applied to the palladium tube or layer should be between about one-half to two pounds (e. g. one pound), per square inch, which is well below the tensile strength and yield point of the metal even at the high temperatures of operation when the metal becomes brittle.

A specific operative device comprises at least one tube of palladium and/or a similarly operative metal enclosed within a gas chamber but at least one end of the tube communicating with means for withdrawing pure hydrogen at reduced pressure. Two or more tubes are advantageously joined within the chamber and a tubular copper coiled spring can be connected therewith to form part of the electrical circuit for resistance heating, for holding the palladium tubes under tension and for supplying cooling to the joints of the palladium tube with the joining means such as a copper tube. An entrance port for the impure hydrogen gas is provided in the gas chamber. Continuity of operation of the apparatus may be extended by the use of bleed off lines which serve partially, and preferably continuously, to remove the concentrated impurities present in the gas, and by the employment of a cascade arrangement of a series of the purifiers maximum recovery of hydrogen can be effected.

For the purpose of illustrating the features and theory of operation of the present invention the following discussion of a device embodying the principles of this invention will be directed to the use of palladium metal and other specific features, but this is not intended to be limiting on the scope of the invention inasmuch as other means can be substituted therefor. For example, among the materials which can be used in place of or along with palladium are nickel, platinum, molybdenum, copper, aluminum, and/or iron. Of these platinum is undoubtedly the next best substitute for palladium, since besides having a fair ability to diffuse hydrogen, it does not undergo a permanent chemical change in the reaction. It should also be stated that aside from the hydrogen isotope of atomic weight 1, deuterium and tritium may likewise be purified in the same manner.

Figure 3:
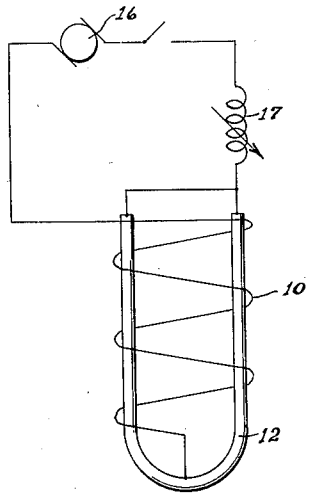
Figure 2:
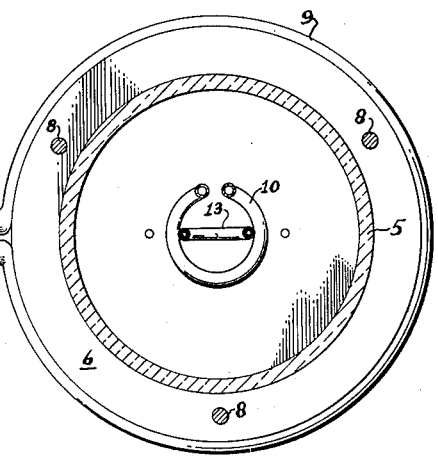

The appended drawing forming part of this specification illustrates one embodiment of the present invention, in which drawing, like reference characters in the several figures represent the same part. In the drawing, Figure 1 is a vertical section of the apparatus. Figure 2 is a horizontal section taken along the line 2—2 in Figure 1. Figure 3 is a schematic wiring diagram of the means for controlling the temperature of the gas-diffusing metal layer.

In the embodiment of the drawing a Pyrex glass cylinder 5 about three inches in diameter and about eighteen inches long is sealed at both ends by brass seals 6 and suitable recessed gaskets 7 drawn tight by threaded tie rods 8 screwed into the top seal and passing through the bottom and taking cooperating nuts which complete the seal upon being tightened and compressing the gaskets. About the circumference of the top and bottom seals, cooling coils 9 are impressed to hold down the temperature of the seals.

The double copper cooling and tension-producing coil 10 enters the chamber through a gas tight and insulating gasket 11 and is maintained in the center of the chamber. With the coil under slight compression, the palladium tubes 12 and the joining U-shaped tube 13 are secured first to the coil. Then further compressing the coil 10, the tubes 12 are joined to the top seal where one tube is embedded and soldered in the seal and the other, though also soldered to the seal, passes therethrough to a leadoff 14 for the pure gas.

In operation, the impure gas enters the chamber at about two pounds per square inch gauge through tubes 15 in the bottom seal 6. As the gas comes in contact with the palladium tubes, the diffusion starts with a hydride being formed in the metal. Since the inner surface of the tube is held at a lower pressure, e. g. about one-half pounds per square inch less than atmospheric, there is a tendency for the gas to diffuse through the metal at a steady rate.

The uniformity of this rate of flow throughout the metal depends on the evenness of the heat throughout the metal and also on the maintenance of the physical characteristics of the tubes.

The metal tubes are heated directly and simply by having the cooling coils, as one terminal, and the tubes incorporated in the circuit by grounding to the top seal which serves as the other terminal. Since the copper coils have little electrical resistance and are cooled by the circulating fluid, they do not heat up. However, the palladium tubes being of high electrical resistance glow red, e. g. 900° C. when the current passes through them. As shown in Figure 3 the current flow is caused by a power source 16 such as an A. C. generator and is controlled by a variable auto-transformer 17. It has been found that a current of 30–40 amperes brings the temperature to that most practical for working.

With the temperature within the range of 500–1000° C. the apparatus will produce about a liter of pure hydrogen per five minutes. Because of the impurities in the incoming gas it is necessary to shut down the apparatus periodically but this period may be radically reduced by using a relatively pure gas to begin with and by using a continuous bleed-off system whereby the impurities are removed systematically. For example one of the input pipes 15 can be used to bleed-off a portion of the gas continuously.

As many widely different embodiments of this invention may be made without departing from the spirit and scope thereof, it is to be understood that the applicants do not limit themselves to the theories of operation, specific disclosures or embodiments except as defined in the appended claim.

In the specification and claim reference to hydrogen is intended to include the various isotopes thereof.

What is claimed is:

An apparatus for the purification of hydrogen isotopes comprising a metal tube means through which hydrogen isotopes reactively diffuse at high temperatures, means supporting one end of the diffusing means and providing an electrical connection to said diffusing means, a hollow coiled copper spring attached to another end of said diffusing means to hold said diffusing means under tension and to provide a second electrical connection, said spring having an inlet and an outlet for cooling fluid, means for applying an electric current to said diffusing means through said electrical connections to heat said means resistively, means for passing cooling fluid through said hollow copper spring, means for bringing the gaseous mixture into contact with the outer wall of said metal tube diffusing means, and means for carrying off pure gas at a lower pressure from the inner wall of said metal tube diffusing means.

L. D. PERCIVAL KING.
CHARLES P. BAKER.
RAEMER E. SCHREIBER.

REFERENCES CITED

The following references are of record in the file of this patent:

UNITED STATES PATENTS

| Number | Name | Date |
|---|---|---|
| 1,174,631 | Snelling | Mar. 7, 1916 |
| 1,751,715 | Peters | Mar. 25, 1930 |

OTHER REFERENCES

Industrial and Engineering Chemistry, Analytical Edition, vol. 10, pp. 544–547 (1938).